No. 651,426. Patented June 12, 1900.
A. NELSON.
CONE BEARING.
(Application filed Sept. 29, 1899.)

(No Model.)

Witnesses:
Frank S. Blanchard
P. J. Le Moyne

Inventor:
Alex Nelson
By Louis V. Le Moyne
Attorney

THE NORRIS PETERS CO., PHOTO-LITHO., WASHINGTON, D. C.

United States Patent Office.

ALEX NELSON, OF CHICAGO, ILLINOIS.

CONE-BEARING.

SPECIFICATION forming part of Letters Patent No. 651,426, dated June 12, 1900.

Application filed September 29, 1899. Serial No. 732,011. (No model.)

*To all whom it may concern:*

Be it known that I, ALEX NELSON, a citizen of the United States, residing at Chicago, county of Cook, State of Illinois, have invented a new and useful Improvement in Cone-Bearings, of which the following is a specification.

The object of my invention is to provide a bearing designed chiefly for bicycles, in which the cone may be adjusted to take up the wear upon it.

It is found in practice that in ordinary bearings the cone will wear away with usage, making a loose bearing, and the cone cannot be screwed up to take up this wear, because the collar upon it, which forms the dust-proof joint, comes against the hub. It is therefore necessary to cut away the collar or the hub; but as these are made of tempered steel this is difficult and expensive. My invention aims at overcoming these objections.

It consists of a cone which is made adjustable on the shaft and a collar which is adjustable upon the cone.

It further consists of details hereinafter more fully described, and particularly pointed out in the claim.

Figure 1:
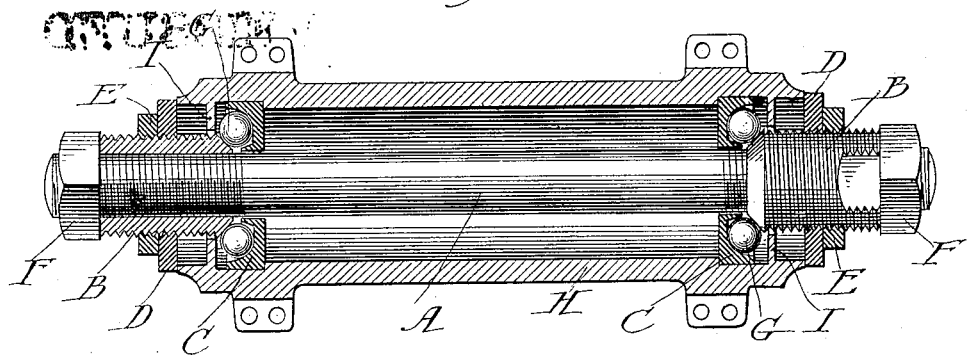
Figure 2:
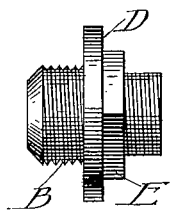
Figure 3:
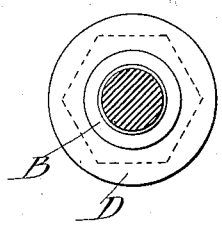

Figure 1 is a sectional view through a bicycle shaft and hub, showing my invention. Fig. 2 is a detail view of the cone removed. Fig. 3 is an end view of the same.

A represents the shaft; B, the adjustable cone thereon; C, the bearing-cups in the hub; D, the adjustable collar on the cone B; E, the set-nut by which the collar is retained in place; F, the nut on the end of the shaft by which the cone is retained in place; G, the balls of the bearing, and H the hub.

I represents the retaining-collar, formed upon the interior of the hub and integral therewith, which prevents the balls from falling out when the cone is removed.

The operation of my invention is as follows: When it is desired to take up the wear in the bearings, the collar D and set-nut E are removed, the sleeve B, which forms the adjustable cone-bearing, is screwed up the proper amount, the collar D is screwed on over it until it forms a tight joint with the hub H, the set-nut E is then screwed up tight against it to retain it in place, and the nut F is put on the end of the shaft. In the same way my cone may be applied to bearings of slightly-different forms and differing from it in the depth of the cup which holds the balls, giving it a more or less general applicability. Thus it will be seen that the bearing is conveniently adjusted, or in case it is necessary to grind the cone it may be readily removed and replaced when ground and the cone thus made adaptable to bearings of different depths or patterns.

What I claim, and desire to secure by Letters Patent, is—

The herein-described adjustable bearing, consisting of the combination of the hub H, having the integral flange, I, the fixed cup C, in said hub, the balls G in said cup, the shaft A, the cone B, adjustable upon said shaft, the collar D, adjustable upon said cone, to close the space between said cone and the end of said hub, and the set-nut E, for retaining said collar in place, all substantially as shown and described.

ALEX NELSON.

Witnesses:
CHARLES J. DRIEVER,
LOUIS V. LE MOYNE.